Oct. 1, 1968     J. M. EASTMAN ET AL     3,403,509

PURE FLUID TEMPERATURE SENSOR

Filed Sept. 30, 1966     2 Sheets-Sheet 1

INVENTORS
JAMES M. EASTMAN
GEORGE R. HOWLAND
BY

*Gordon H. Chenez*

AGENT

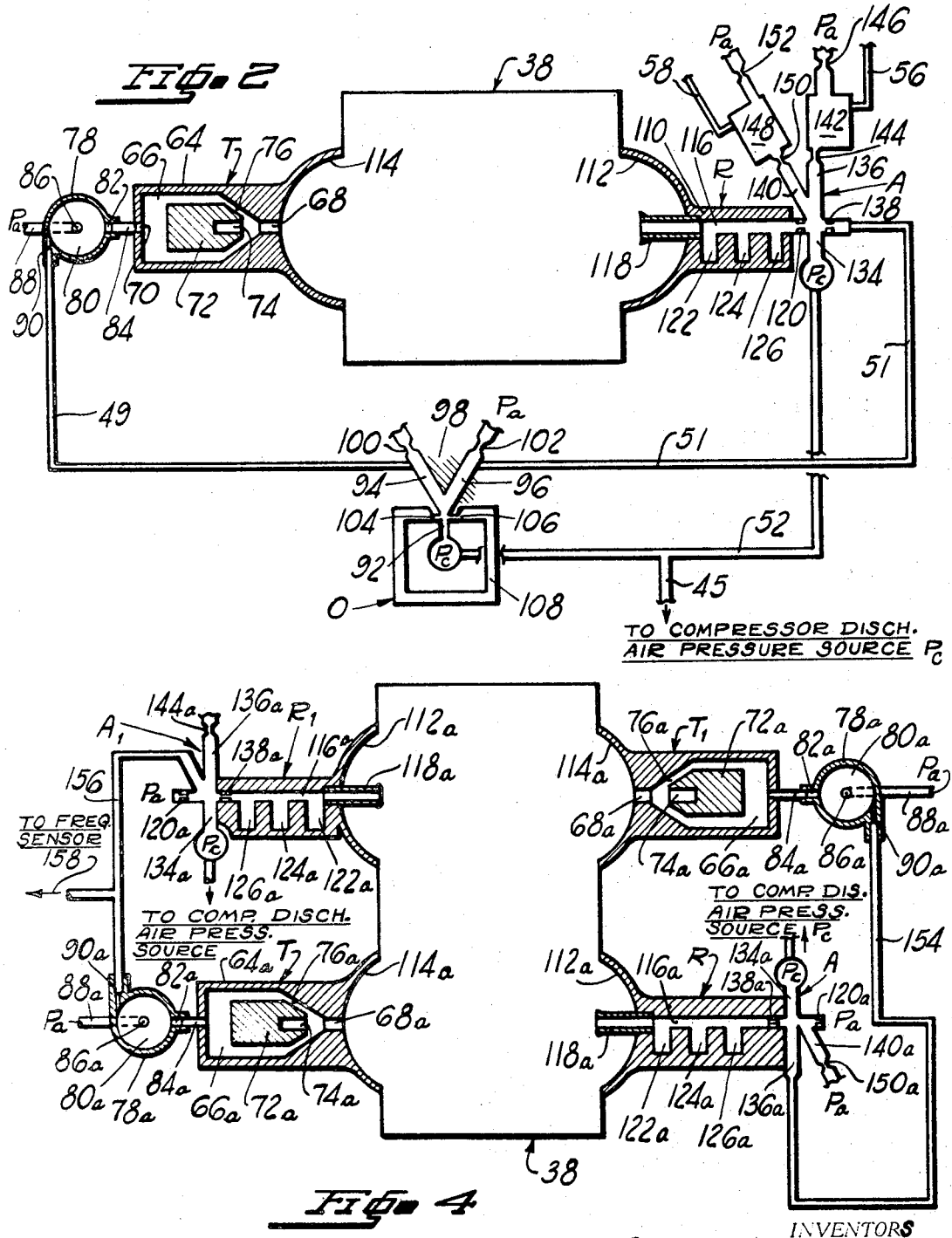

United States Patent Office 3,403,509
Patented Oct. 1, 1968

3,403,509
PURE FLUID TEMPERATURE SENSOR
James M. Eastman and George R. Howland, South Bend, Ind., assignors to The Bendix Corporation, a corporation of Delaware
Filed Sept. 30, 1966, Ser. No. 583,363
14 Claims. (Cl. 60—39.28)

ABSTRACT OF THE DISCLOSURE

A temperature sensing mechanism for producing signals which regulate the fuel supply to the combustion chamber of a gas turbine engine, said mechanism including pure fluid sound generating means and pure fluid sound receiving means, and said signals being responsive to temperature conditions of said combustion chamber.

---

This invention relates, in general, to temperature responsive mechanism for sensing the temperature of a relatively hot fluid and, in particular, to temperature sensing mechanism operating on a pneumatic ultrasonic principle to provide a usable output control signal representative of the relatively high temperature of a fluid such as the hot motive gas discharged by a hot gas generator of a gas turbine unit but not limited to such use.

Existing temperature sensing mechanisms are deficient for use in a relatively high temperature environment such as the gas inlet to a gas turbine where it is desirable to maintain the gas temperature at a maximum for the purpose of optimum engine efficiency but without exceeding the temperature limits of the material from which the gas turbine blades and associated structure are made as will be understood by those skilled in the art. Attempts have been made to insert conventional temperature probes in or near the path of the hot motive gas passing to the gas turbine blades to sense the temperature of the hot motive gas but the results have been unsatisfactory in that among other things, suitable known materials from which temperature probes can be made are unable to withstand the heat and/or abrasive effects of the hot motive gas for only relatively short periods of time before deteriorating, after which the temperature probe must be removed and replaced or not relied upon. Obviously, the lack of reliability, and/or maintenance requirements in addition to related disadvantages renders the use of such temperature probes impractical until such time as new materials suitable for making such probes and capable of withstanding the destructive effects of such hot motive gas become available.

Other attempts utilizing the principle of speed of sound as a function of the temperature of a fluid traversed thereby are recognized but, as far as is known, such apparatus requires relatively sensitive electrical, complicated, expensive, bulky and/or weighty, components which are not reasonably adequate for use in a high temperature environment such as that heretofore mentioned.

It is therefore an object of the present invention to provide relatively simple and reliable temperature sensing mechanisms for use in a relatively high temperature fluid environment.

It is another object of the present invention to provide temperature sensing mechanism for use in sensing the temperature of a relatively hot fluid which mechanism is substantially free of moving parts and capable of providing a consistently reliable output control signal representative of the sensed temperature of a fluid.

It is an important object of the present invention to provide pneumatic ultrasonic temperature sensing mechanism which is adapted for use in determining the temperature of a relatively hot motive gas.

It is a further object of the present invention to provide pure fluid mechanism for sensing a condition of a fluid and providing an output fluid pressure signal representing said sensed condition.

Other objects and advantages of the present invention will be apparent from the following description taken with the accompanying drawings wherein:

FIGURE 2 is a schematic representation in section of the temperature sensing mechanism embodying the present invention of FIGURE 1;

FIGURE 4 is a schematic representation in section of the temperature sensing mechanism of FIGURE 3.

Figure 1:
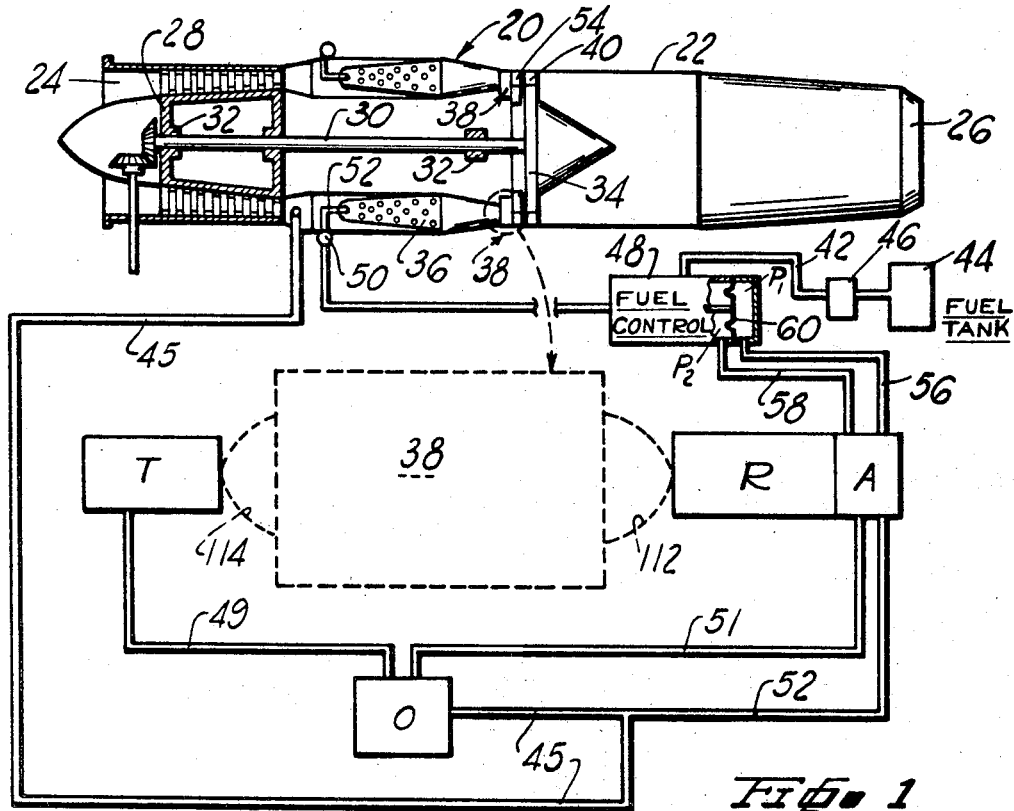
FIGURE 1 is a schematic representation of a gas turbine engine and a fuel control system therefor embodying the present invention with principal components thereof shown in block form.

Referring to FIGURE 1, numeral 20 represents a gas turbine engine of the aircraft type having a casing 22 provided with an air inlet 24 and an exhaust nozzle 26. An air compressor 28 is rotatably driven by a shaft 30 suitably journaled in bearings 32 and connected at its opposite end to a gas turbine 34 which drives the same. The compressor 28 discharges air at relatively high pressure $P_c$ to one or more combustion chambers 36 having discharge sections 38 directed toward blades 40 of gas turbine 34. A conventional fuel system adapted to supply metered flow of fuel to the combustion chambers 36 includes a conduit 42 through which fuel from a tank 44 and pressurized by an engine driven fuel pump 46 is controlled by a fuel control 48 as a function of various engine operating conditions which may include throttle lever position, engine speed, engine air pressures, and the like, not shown. The pressurized metered flow of fuel from fuel control 48 passes through conduit 42 to a fuel manifold 50 then through fuel nozzle 52 connected to inject fuel into combustion chambers 36. The injected fuel mixes with pressurized air in combustion chambers 36 where combustion occurs with the resulting hot motive gas passing therefrom through discharge sections 38 then through a plurality of circumferentially spaced apart turbine inlet guide vanes or blades 54 which direct the hot motive gases angularly relative to the plane of rotation of the turbine 34. The hot motive gases impinge the blades of turbine 34 thereby driving the turbine 34 from which the gases exhaust through nozzle 26 to the atmosphere thereby generating propelling thrust.

For optimum engine efficiency, the temperature of the gases discharged from combustion chambers 36 should be as high as possible without exceeding the temperature limitations imposed by the structural characteristics of the gas turbine 34 and particularly the turbine blades attached thereto as well as the surrounding structure exposed to the hot motive gas flow. Thus, it is imperative that any temperature sensing mechanism exposed to the hot motive gas discharged by the combustion chambers 36 must provide a consistent, reliable and accurate indication of the gas temperature to maintain the desired optimum engine efficiency without exceeding the limiting temperature imposed by the gas turbine 34 and adjacent structure. To this end, the present invention is adapted to be located at the discharge end of the combustion chambers 36 as close as practical to the blades of the gas turbine 34.

Applicants' temperature sensing mechanism includes a sound generator or transmitter generally indicated by T suitably secured to one side of the discharge section 38 of combustion chamber 36 and aligned with a sound receiver R including amplifier A suitably secured to the opposite side of the discharge section 38 of combustion chambers 36 so that the hot motive gases pass between T and R. An oscillator designated by O is connected to receive compressor discharge air at pressure $P_c$ via an input conduit 45 and is connected via outlet conduits 49 and 51 to transmitter T and amplifier A, respectively. The amplifier A is connected to receive air at pressure $P_c$ via conduit 52 leading thereto from conduit 45. It will be understood that the heat transmitted to the transmitter T and receiver R and thus the temperature thereof will be subdued to a significant extent by the boundary layer effect of the motive gases passing over the combustion chamber 36 wall to which the transmitter and receiver are attached.

The amplifier A is of the pure fluid type and adapted to provide separate fluid pressure output signals, $P_1$ and $P_2$, which are transmitted to the fuel control 48 via passages 56 and 58 leading to opposite sides of a diaphragm 60 suitably connected to conventional fuel control mechanism, not shown, within the fuel control 48 which may take the form of a valve member, not shown, in flow controlling relationship to conduit 42 which valve member is controlled toward an open or closed position to effect a corresponding increase or decrease in fuel flow to the chambers 36 depending upon the relative change in pressure differential across diaphragm 60.

Referring to FIGURE 2, the transmitter, T, will be recognized as including a conventional Hartmann oscillator or whistle which is well known to those persons skilled in the art and which, in general, includes a casing 64 defining a circular chamber 66 having centrally located inlet and outlet orifices, 68 and 70, respectively. A fixed cylindrical plug 72 suitably secured in position in chamber 66 is provided with a centrally located circular cavity 74 in one end thereof axially aligned with inlet orifice 68. Hot motive combustion gas or preferably cooler boundary layer gas from discharge section 38 passes through inlet orifice 68 and annular passage 76 defined by spaced apart adjacent surfaces of plug 72 and casing 64 into chamber 66 from which the hot combustion gas exits via outlet orifice 70 to a relatively low pressure sink. The air in the cavity 74 is excited and self oscillates at a frequency determined by the dimensions of cavity 74 thereby generating an oscillating impedance to the flow through inlet orifice 68 which, in turn, results in a series of fluid pressure waves at the frequency of oscillation. The fluid pressure waves propagate upstream into the discharge section 38. Reference is made to the publication "Ultrasonic Engineering," pages 115 through 121, written by Alan E. Crawford and published in 1955 by Butterworths Scientific Publications, London, England, for details concerning the theory of operation of the above described Hartmann oscillator or whistle.

The flow of combustion gas out of chamber 66 and thus operation of the Hartmann oscillator is controlled by a conventional so called vortex fluid amplifier 78 which, in general, consists of a circular chamber 80 having a radial inlet port 82 connected to outlet orifice 70 via passage 84, a centrally located outlet port 86 connected to a relatively low pressure fluid sink such as the atmosphere at pressure $P_a$ via passage 88, and a tangential control port 90 through which a flow of fluid is injected tangentially to chamber 80. The flow of fluid injected by control port 90 generates a fluid vortex within chamber 80 which impedes the flow of combustion gas through inlet port 82 depending upon the mass of fluid injected by control port 90 and angular velocity of the same. In the absence of a control flow through the control port 90, the combustion gas passes freely through inlet port 82 and axially through chamber 80 from which it exits via outlet port 86. For additional details reference is made to Patent No. 3,195,303 issued July 20, 1965, to George M. Widell (common assignee) which discloses a vortex fluid amplifier of the abovementioned type.

The oscillator O consists of a conventional flip-flop type bistable fluid oscillator having a main or power nozzle 92 connected to receive pressurized compressor discharge air $P_c$ via passage 45 and discharge the same in the form of a fluid jet to either diverging passage 94 or 96 separated by a wedge shaped divider 98 and provided with restrictions 100 and 102, respectively, at the discharge ends thereof which discharge ends are vented to a relatively low pressure fluid sink such as the atmosphere or other suitable relatively low pressure source $P_a$. A pair of oppositely disposed control orifices 104 and 106 extending substantially at right angles to nozzle 92 provides fluid communication between the fluid passing through nozzle 92 and a fluid feedback passage 108 connecting orifices 104 and 106. Passages 49 and 51 communicate with passages 94 and 96 upstream from the respective restrictions 100 and 102 and are adapted to transmit output fluid pressure pulse signals therefrom as will be described hereinafter. Reference is made to U.S. Patent No. 3,016,066 issued Jan. 9, 1962, to R. W. Warren which shows and describes to greater detail a fluid oscillator similar to oscillator O.

The pneumatic receiver R includes a casing 110 having a parabolic reflector 112 or other suitable sound concentrating device such as an exponential horn at one end thereof suitably connected to discharge section 38 by any conventional connecting means, not shown, and aligned with an oppositely disposed reflector 114 or exponential horn, not shown, attached to casing 64 of transmitter T. The reflector 114, like reflector 112 is suitably connected to discharge section 38 by any suitable conventional connecting means, not shown. A passage 116 in casing 110 is counterbored at one end to receive one end of a tube 118 fixedly secured in position therein. The tube 118 is axially aligned with reflector 112 with its free end terminating at the focal point of the reflector 112. Hot motive combustion gas or cooler boundary layer gas pulsating at the frequency of the transmitted pressure pulses from transmitter T and reflected by reflector 112 passes through tube 118 to restricted control port 120 of amplifier A. The pulsating gas passing through tube 118 may be amplified by a series of acoustical resonant chambers 122, 124 and 126 which are of equal volume and selected to resonate at the frequency of the pressure pulses transmitted through tube 118. Such resonant chambers 122, 124 and 126 are well known in the art and additional details thereof are available from "Elements of Acoustical Engineering" by Harry F. Olson, E.E., Ph. D., third printing, October 1943, by D. Van Nostrand Company, Inc., 250 Fourth Avenue, New York City, N.Y. In particular reference is made to page 63 of the abovementioned book.

The amplifier A will be recognized as a conventional "And Not" fluid gate or valve of the monostable type wherein a fluid jet expelled by nozzle 134 passes to passage 136 in alignment with nozzle 134 in the event of opposing equivalent control fluid jets injected by oppositely disposed restricted control ports 120 and 138 arranged substantially at right angles to nozzle 134 and connected to passages 116 and 51, respectively. In the event of a control fluid jet injected by control port 138, overcoming the opposed fluid jet from control port 120 or in the absence of the latter control jet the fluid jet expelled by nozzle 134 is biased to the left into passage 140 angularly arranged relative to the axes of nozzle 134. Passage 136 is provided with a chamber 142 of predetermined fixed volume in series with restrictions 144 and 146 upstream and downstream, respectively, therefrom. Chamber 142 is vented to passage 56. Passage 140 is provided with a chamber 148 of a predetermined fixed volume in series with restrictions 150 and 152 upstream and downstream, respectively, therefrom. Chamber 148 is vented to passage 58. Either passage 136 or 140 recovers pressure from the power jet formed by nozzle 134 depending upon the bias of the power jet. When the jet is directed into one of the passages 136 or 140 the pressure in the remaining passage 136 or 140 drops so that the latter passage acts as a sink and air flows from associated chamber 142 or 148 into the passage which does not receive the power jet flow.

Operation of FIGURE 2

It will be assumed that the engine 20 is operating at a self sustaining speed with operating temperatures and pressures at normal levels accordingly. The compressor discharge air at relatively high pressure $P_c$ passes through passages 45 and 52 to oscillator O and amplifier A, respectively, where the gas flow issues as a fluid jet from the respective nozzles 92 and 134. The fluid jet from nozzle 134 passes to passage 136 thereby pressurizing chamber 142.

The fluid jet from nozzle 92 passes initially to passage 96 from which the pressurized flow is transmitted via passage 51 to control port 138 which, in turn, issues a fluid jet transversely to nozzle 134 thereby biasing the power jet to the left into passage 140. The power jet from nozzle 92 remains attached to the wall of passage 96 as a result of the well known Coanda effect or lower pressure area generated between the power jet and adjacent wall. The low pressure area establishes a pressure differential between ports 104 and 106 and a resulting flow through passage 108 from port 104 to 106 which, in turn, tends to destroy the low pressure area causing the power jet to flip from passage 96 to passage 94. As in the case of power jet flow into passage 96, the power jet becomes attached to the wall adjacent port 104 as a result of the generated low pressure area. With power jet flow into passage 104, the resulting pressure differential established between ports 104 and 106 causes flow through passage 108 from port 106 to port 104 which tends to destroy the low pressure area adjacent port 104 causing the power jet to flip back to pasage 96. Thus, the power jet oscillates between passages 94 and 96 at a frequency dependent upon the relative sizes of the nozzle 92 and ports 104 and 106. With the power jet flow into pasage 94, the resulting pressurized flow therein is transmitted to control port 90 via passage 48. Preferably, the frequency of oscillator O is on the order of 200 to 1,000 c.p.s.

Assuming the passages 51 and 49 to be of equal length, a pressure pulse at control port 138 and resulting pressurization of chamber 148 will occur simultaneously with the lack of pressurized flow at the control port 90. The lack of pressurized flow at control port 90 permits hot motive combustion gas to flow through orifice 68 around plug 72 and through chamber 66 from which it exits through passage 70 to inlet port 82 then through chamber 80 and outlet port 86 to exhaust pressure $P_a$. The gas in the cavity 74 of plug 72 becomes excited as a result of the flow through orifice 68 and self oscillates at a frequency dependent upon the cavity dimensions thereby establishing oscillating impedance to flow through orifice 68. The resulting series of gas pressure waves propagate upstream of orifice 68 across the discharge section 38 and are received by the reflector 112 which focuses the same on tube 118 through which the pressure waves pass to passage 116. The tube 118 is adapted to resonate at the frequency to transmitter T with the output of tube 118 distinguishing over the background noise existing in combustion chamber 36 since the tube 118 rejects pressure pulses at any frequency other than transmitter T frequency. The output of tube 118 passes to passage 116 where volumes 122, 124 and 126 provide a well known narrow band pass or notch filtering effect which results in amplification of the pressure pulses which are subsequently transmitted to control port 120. The resulting jet issued by control jet 120 against the power jet of amplifier A in opposition to the opposing jet issued by control port 138 deflects the power jet from passage 140 to the passage 136 thereby pressurizing chamber 142. The power jet will not respond to the receiver resonant frequency but amplifier A is designed to respond to the average resonator positive pressure output. It thus responds to the half wave rectified pressure pulsation. The time taken for a pressure pulse to pass from transmitter T to receiver R is dependent upon the distance therebetween and the temperature of the gas flowing therebetween. The transmitter T to receiver R distance is fixed and the temperature of the gas flow variable from which it follows that the time during which the power jet of amplifier A is biased to passage 140 by the jet issued from control port 138 is directly proportional to the elapsed time of a pressure pulse propagating from the transmitter T to receiver R and thus proportional to the square root of the average temperature of the gas flowing through discharge section 38.

By means of chamber 142 with associated restrictions 144, 146 and chamber 148 with associated restrictions 150, 152 which define identical fluid resistance and volume circuits through which total flow from passages 136 and 140, respectively, must pass, the total flow through passages 136 and 140 may be time integrated so that the pressure differential $P_1-P_2$ generated between chambers 142 and 148 is a function of the temperature of the gas passing through discharge section 38. The passages 56 and 58 connect chambers 142 and 148, respectively, with diaphragm 60 thereby establishing the generated pressure differential $P_1-P_2$ across diaphragm 60 which, in turn, responds accordingly thereby controlling the quantity of fuel delivered to the combustion chambers 36 as required to maintain the temperature of combustion gas at a desired level.

Figure 3:
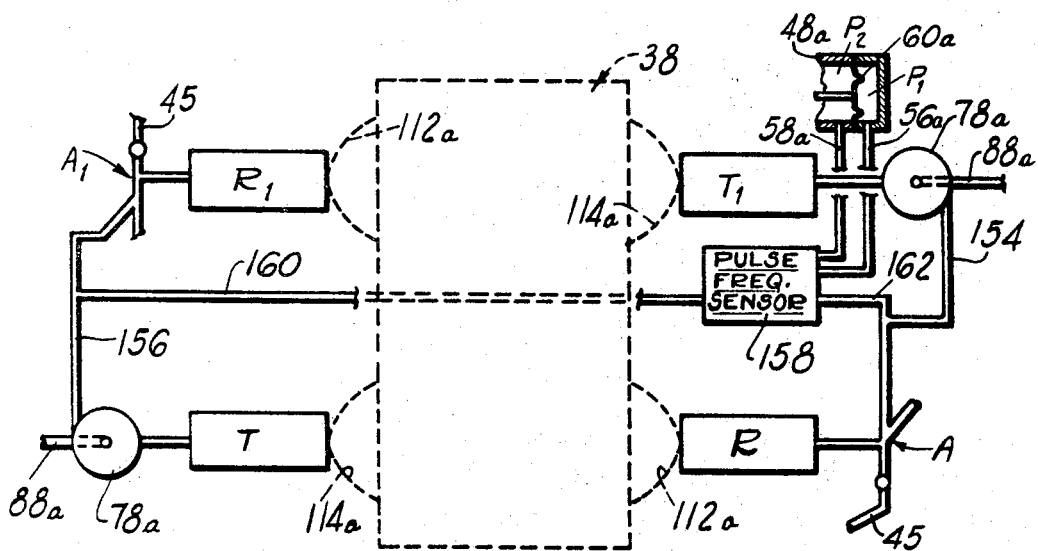
FIGURE 3 is a schematic representation of a modified temperature sensing mechanism embodying the present invention with the principal components thereof shown in block form.

Referring to FIGURES 3 and 4, there is shown a modified arrangement of the present invention wherein structure similar to that of FIGURE 2 is designated by like numerals with added subscript $a$. It will be noted that two like transmitters, T and $T_1$, and two like receivers, R and $R_1$, are utilized. The oscillator O of FIGURE 2 is not required as the arrangement of FIGURE 4 is self-oscillating as will be described.

The transmitter T and receiver $R_1$ are secured to discharge section 38 in spaced apart relationship and aligned with receiver R and transmitter $T_1$, respectively, which are secured to the opposite side of discharge section 38. The amplifier A associated with receiver R is provided with a passage 154 connecting passage 136a upstream from restriction 144a with control port 90a of vortex amplifier 78a associated with transmitter $T_1$.

The passage 136a associated with receiver $R_1$ is connected via a passage 156 with control port 90a of vortex amplifier 78a associated with transmitter T.

The passage 56a and/or 58a leading to opposite sides of diaphragm 60 may be connected to receive the output of a pulse frequency sensor 158 which receives pressure pulses via passages 160 and 162 leading from passage 156 and 154, respectively.

Operation of FIGURE 4

It will be assumed that the engine 20 is operating at a self sustaining speed as in the case of FIGURE 2 heretofore described. Compressor discharge air at pressure $P_c$ passes to nozzles 134a of amplifiers A and $A_1$ where the respective fluid jets issued therefrom pass to the respective passages 136a of amplifiers A and $A_1$. The pressure $P_1$ in chamber 142a of amplifier $A_1$ increases at a predetermined rate dependent upon the volume of chamber 142a and relative area of restrictions 144a and 146a in series therewith. The pressure $P_1$ is transmitted via passage 56a to the one side of diaphragm 60.

The fluid jet passing to passage 136a of amplifier A results in pressurized flow through passage 154 to control port 90a of vortex amplifier 78a where the resulting fluid vortex generated therein impedes flow through inlet port 82a as well as chamber 66a and orifice 68a upstream therefrom which, in turn, renders transmitter $T_1$ inoperative. Simultaneously with impedance of flow through inlet port 82a, the lack of pressurized flow from amplifier $A_1$ through passage 156 to control port 90a of vortex amplifier 78a results in unrestricted flow through inlet port 82a of the latter mentioned vortex amplifier 78a thereby permitting combustion gas to pass through orifice 68a and chamber 66a of transmitter T which, in turn, sets transmitter T in operation. The pressure waves generated by transmitter T propagate across discharge section 38 and are received by receiver R where, as in the case of FIGURE 2, the output pressure waves from tube 118a are amplified by resonant chambers 122a, 124a and 126a. The amplified output of receiver R is transmitted to control port 138a of amplifier A where the resulting fluid jet issued by port 136a acts against the nozzle 134a fluid jet causing the same to pass into passage 140a thereby depressurizing passage 136a. It will be noted that the control port 120a oppositely disposed to control port 138a is vented to the low pressure sink Pa so that the control port 138a fluid jet has no opposing control fluid jet. The depressurization of passage 136a and corresponding lack of flow to control port 90a of vortex amplifier 78a permits combustion gas to pass through the inlet port 82a, chamber 80a and outlet port 86a to low pressure source Pa with substantially no restriction which reduces impedance to flow through orifice 68a and chamber 66a of transmitter $T_1$ thereby setting transmitter $T_1$ in operation. The pressure waves generated by transmitter $T_1$ propagate across discharge section 38 to receiver $R_1$ where the reflector 112a focuses the pressure oscillations on tube 118a which transmits the same to passage 116a where the pressure oscillations are amplified and transmitted to control port 138a of amplifier $A_1$ where the resulting fluid jet acts against the nozzle 134a fluid jet causing the same to pass into passage 140a thereby depressurizing passage 136a and pressurizing passage 140a. It will be noted that control port 120a of amplifier $A_1$ is vented to pressure sink Pa as in the case of amplifier A. The passage 156 transmits pressurized flow from passage 140a to control port 90a of vortex amplifier 78a where the resulting fluid vortex generated in chamber 80a impedes flow through inlet port 82a which, in turn, blocks flow through orifice 68a and chamber 66a of transmitter T thereby temporarily rendering the same inoperative. The resulting absence of a pressure oscillation to receiver R permits the nozzle 134a fluid jet of amplifier A to switch from passage 140a to 136a which results in pressurized flow to control port 90a of vortex amplifier 78a where the resulting fluid vortex disestablishes flow through orifice 68a, chamber 66a and inlet port 82a which, in turn, renders transmitter $T_1$ temporarily inoperative. The absence of a pressure oscillation to receiver $R_1$ permits the nozzle 134a fluid jet to switch from passage 140a to passage 136a which results in depressurization of passage 140a and subsequent activation of transmitter T as mentioned heretofore. The heretofore described cycle of operating events are continuously repeated in sequence until the engine 20 is shut down.

The pressure conduits 154 and 156 are subject to pulsating pressures 180° out of phase with each other and at a frequency determined by the mean temperature of the combustion gas in burner discharge section 38. One or both of the conduits 154 and 156 are vented to the pulse frequency sensor 158 via passages 162 and 160, respectively. It will be recognized by those persons skilled in the art that use of both passages 160 and 162 to supply two input pressure pulse frequencies 180° out of phase will provide a push-pull function to the system. The pulse frequency sensor 158 is conventional and may be of any suitable type known in the art and is not therefore shown or described in detail. The pulse frequency sensor 158 may be of the error sensing type in which case an input reference frequency signal representing, for example, a temperature datum may be applied thereto. Such an arrangement is conventional and typically consists of a reference frequency oscillator, means for measuring the difference between the input pulse frequency and oscillator frequency and means for converting the frequency differential to an analog error signal such as the pressure differential $P_1-P_2$ heretofore described to thereby alter fuel flow and control combustion chamber gas temperature accordingly. Reference is made to "Applications of Pure Fluid Techniques to a Speed Control" by J. R. Colston and E. M. Dexter and submitted in the Proceedings of the Fluid Amplification Symposium dated May 1964. Several speed governors are described in the above-mentioned literature wherein speed is converted to a pressure pulse frequency and a digital frequency error sensor generates an analog error output to control fuel flow in a manner similar to that required in the present case.

In FIGURE 4, the receiver R and transmitter $T_1$ may be replaced by a suitable conventional reflector, not shown, capable of reflecting the ultrasonic sound waves transmitted by transmitter T to receiver $R_1$. It will be understood that the reflected sound waves should not be excessively attenuated as a result of the required two passes across the discharge section 38.

Referring to FIGURE 4, it may be advantageous to operate transmitter $T_1$ and receiver $R_1$ at a different frequency than transmitter T and receiver R thereby precluding the possibility of interfering sound wave propagation from transmitter T to receiver $R_1$ and/or from transmitter $T_1$ to receiver R.

If desired, compressor discharge air pressure from any suitable source may be vented to the inlet side of orifice 68 of transmitter T and/or to the inlet side of tube 118 of receiver R to thereby maintain the temperature of the gas passing through the same well below the combustion gas temperature. Also, it will be understood that the flow through transmitter T may be reversed as, for example, by connecting the inlet 82 of vortex amplifier 78 to receive compressor discharge air at pressure $P_c$ which is sufficiently higher than combustion chamber pressure by virtue of combustion chamber pressure loss, connecting outlet 86 of vortex amplifier 78 to the inlet 68 of transmitter T, and turning plug 72 and inlet orifice 180° from the position shown in FIGURE 2 so that the pressure oscillations generated thereby propagate downstream therefrom into the combustion chamber.

It is recognized that the above described temperature sensing apparatus may be adapted to other uses. For example, it will be noted that, assuming a constant gas temperature in discharge section 38, the output pressure differential $P_1-P_2$ will be a function of the distance traversed by the sound waves in passing between opposite sides of discharge section 38. Thus, by suitable modification of the above described apparatus, as will be recognized by those persons skilled in the art, the present invention may be adapted for use in gauging or dimensional inspection work.

Various modifications and changes in the above described apparatus may be made by those persons skilled in the art without departing from the scope of applicants' invention as set forth in the following claims.

We claim:
1. Condition sensing apparatus comprising:
    means defining a source of relatively high pressure fluid;
    pure fluid sound generating means operatively connected to said source and adapted to generate fluid pressure oscillations of predetermined ultrasonic frequency which propagate through said relatively high pressure fluid;
    pure fluid sound receiving means operatively connected to said source in spaced apart relationship to said pure fluid sound generating means and adapted to resonate in response to said fluid pressure oscillations of predetermined ultrasonic frequency to thereby produce corresponding output fluid pressure signals;
    pure fluid valve means operatively connected to said sound receiving means and responsive to said output fluid pressure signals for generating an output fluid pressure signal representative of a condition of said source of relatively high pressure fluid;

pure fluid control means operatively connected to said sound generating means and said pure fluid valve means for controlling the operation thereof in timed relationship; and control means responsive to said output fluid pressure signal generated by said pure fluid valve means.

2. Condition sensing apparatus as claimed in claim 1 wherein:

said pure fluid sound generating means includes a fluid flow conduit communicating with said relatively high pressure fluid source and means for creating fluid pressure oscillations in said conduit which propagate therefrom into said high pressure fluid source; and said pure fluid sound receiving means includes a conduit connected to transmit said relatively high pressure fluid and having resonator means therein adapted to resonate in response to said generated fluid pressure oscillations thereby producing a corresponding pressure amplification in the pressure pulsations in the relatively high pressure fluid passing through said conduit.

3. Condition sensing apparatus as claimed in claim 2 wherein:

said pure fluid valve means includes a power jet nozzle connected to a source of relatively high pressure fluid, first and second output fluid passages connected to receive a power fluid jet issued by said nozzle, a control fluid port connected to receive said output fluid pressure signals from said sound receiving means and inject a control fluid pulse transversely to said power fluid jet to thereby bias the same from said first output fluid passage to said second output fluid passage and a chamber of predetermined volume provided with a restricted inlet and outlet associated with each of said first and second output fluid passages and in series flow relationship therewith to thereby generate corresponding time integrated fluid pressures therein; and said control means includes fluid pressure differential responsive means operatively connected to said chambers associated with said first and second output fluid passage and responsive to the fluid pressure differential therebetween.

4. Condition sensing apparatus as claimed in claim 1 wherein:

said sensed condition of said source of relatively high fluid pressure is temperature;

said pure fluid sound generating means and said pure fluid sound receiving means having a predetermined fixed spaced apart relationship;

said pure fluid valve means being operative to produce first and second fluid pressures of timed duration depending upon the frequency of output fluid pressure signals of said pure fluid sound receiving means;

said frequency of output fluid pressure signals of said pure fluid sound receiving means varying with the speed of sound through said relatively high pressure fluid as a function of the temperature of said high pressure fluid.

5. Condition sensing apparatus as claimed in claim 1 wherein:

said first named means defines a combustion chamber for generating a hot motive gas flow the temperature of which varies with the quantity of fuel flow delivered to the combustion chamber, said pure fluid sound generating means being connected to a side of said combustion chamber and provided with an orifice for venting a portion of said hot motive gas from said combustion chamber to a relatively lower pressure fluid source and means downstream from said orifice for creating said fluid pressure oscillations of predetermined ultrasonic frequency;

said pure fluid sound receiving means being connected to a side of said combustion chamber in fixed spaced apart relationship relative to said sound generating means and provided with a passage for venting a portion of said hot motive gas from said combustion chamber to said pure fluid valve means and means for concentrating the fluid pressure oscillations generated by said sound generating means at the inlet to said passage;

said pure fluid valve means including a power jet nozzle connected to a source of relatively high pressure fluid, first and second output fluid passages connected to receive a power fluid jet issued by said nozzle, a control fluid port connected to the outlet of said passage and adapted to inject control fluid pulses transversely to said power jet to thereby temporarily bias said power fluid jet from said first to said second output fluid passage;

said control means including pulse frequency sensing apparatus operatively connected to said second output fluid passage and responsive to the fluid pressurization thereof and operative to generate a fluid pressure differential output; and fuel control means responsive to said fluid pressure differential output for controlling the flow of fuel to said combustion chamber.

6. Condition sensing apparatus as claimed in claim 1 wherein:

said pure fluid control means includes pure fluid bistable flip-flop valve means having a power jet nozzle connected to a source of relatively high pressure fluid, first and second output fluid passages connected at one end to receive a power jet issued from said power jet nozzle and arranged in diverging relationship, first and second restricted ports connected to said power jet nozzle adjacent said first and second output fluid passages, respectively, a feedback passage connecting said first and second restricted ports for transmitting a fluid signal therebetween which is derived from said power jet flow into one of said first and second output fluid passages and which causes said power jet to flip to the other of said first and second output fluid passages with a predetermined frequency, a first conduit connecting said first output fluid passage with said pure fluid sound generating means for transmitting a fluid pressure signal therebetween to thereby control the operation of said sound generating means and a second conduit connecting said second output fluid passage with said pure fluid valve means for transmitting a fluid pressure signal therebetween to thereby control the operation of said valve means.

7. Condition sensing apparatus as claimed in claim 2 wherein:

said means for creating fluid pressure oscillations in said conduit includes a Hartmann generator and valve means responsive to a series of first fluid pressure signals generated by said pure fluid control means for establishing fluid flow through said generator at timed intervals;

said pure fluid valve means being responsive to a series of second fluid pressure signal generated by said pure fluid control means which act in opposition to said output pressure signals produced by said sound receiving means and impressed on said pure fluid valve means.

8. Condition sensing apparatus as claimed in claim 1 wherein:

said pure fluid sound generating means includes first and second sound generators;

said pure fluid sound receiving means includes first and second sound receivers arranged in fixed spaced apart relationship relative to said first and second generators, respectively;

said pure fluid valve means includes first and second pure fluid valve members operatively connected to said first and second sound receivers, respectively, and responsive to the respective output fluid pressure signals produced thereby;

first passage means connected to transmit said output fluid pressure signal generated by said first pure fluid valve member to said second sound generator for controlling the operation of the latter, second passage means connected to transmit said output fluid pressure signal generated by said second pure fluid valve member to said first sound generator for controlling the operation of the latter; and means operatively connected to at least one of said first and second passage means and responsive to the output fluid pressure signal transmitted therethrough for producing a control fluid pressure signal representing said condition of said source of relatively high pressure fluid.

9. Condition sensing apparatus as claimed in claim 2 wherein:

said pure fluid control means includes a pure fluid valve member of the bistable type adapted to produce a series of output fluid pressure signals of predetermined frequency in each of two output passages;

a first passage connecting one of said two output passages to said sound generating means for controlling the operation thereof;

a second passage connecting the other of said two output passages to said pure fluid valve means for controlling the operation thereof and thus output fluid pressure signal derived therefrom.

10. Condition sensing apparatus as claimed in claim 2 wherein:

said fluid flow conduit communicates said relatively high pressure fluid source with a source of relatively low pressure fluid and said fluid pressure oscillations propagate upstream through said conduit into said high pressure fluid source.

11. Condition sensing apparatus comprising:

means defining a source of pressurized fluid;

pure fluid sound generating means operatively connected to said source and adapted to generate fluid pressure oscillations of predetermined ultrasonic frequency which propagate through said fluid;

pure fluid sound receiving means operatively connected to said source in spaced apart relationship to said pure fluid sound generating means and adapted to resonate in response to said fluid pressure oscillations of predetermined ultrasonic frequency to thereby produce corresponding output fluid pressure signals;

pure fluid valve means operatively connected to said sound receiving means and responsive to said output fluid pressure signals for generating an output fluid pressure signal representative of a condition of said source of fluid;

pure fluid control means operatively connected to said sound generating means and said pure fluid valve means for controlling the operation thereof in timed relationship; and control means responsive to said output fluid pressure signal generated by said pure fluid valve means.

12. Condition sensing apparatus as claimed in claim 11 wherein:

said pure fluid sound generating means includes a conduit defining fluid communication between said source of fluid and a second source of relatively higher pressure fluid; and means for creating fluid pressure oscillations in said conduit which propagate downstream through said conduit into said source of fluid.

13. Condition sensing apparatus as claimed in claim 12 and further including:

fluid flow control means in said conduit in flow controlling relationship therewith and responsive to a source of fluid pressure signals generated by said pure fluid control means for establishing fluid flow through said means to create fluid pressure oscillations at timed intervals.

14. Condition sensing apparatus as claimed in claim 13 wherein:

said fluid flow control means is a pure fluid vortex amplifier having a fluid supply inlet and an outlet in series flow relationship with said conduit and a control fluid inlet connected to receive said series of fluid pressure signals.

References Cited
UNITED STATES PATENTS

| | | | |
|---|---|---|---|
| 2,971,329 | 2/1961 | Barry | 137—15.2 |
| 3,214,976 | 11/1965 | Miller | 73—339 |
| 3,282,051 | 11/1966 | Unfried | 137—81.5 |
| 3,299,707 | 1/1967 | Noel | 73—339 |
| 3,302,398 | 2/1967 | Taplin et al. | 60—39.28 |

JULIUS E. WEST, *Primary Examiner.*